Sept. 21, 1965     C. W. WEILAND     3,207,245

GROUND EFFECT MACHINE

Filed Nov. 2, 1960     3 Sheets-Sheet 1

INVENTOR
CARL W. WEILAND
BY Cushman, Darby & Cushman
ATTORNEYS

INVENTOR
CARL W. WEILAND
BY Cushman, Darby & Cushman
ATTORNEYS

Sept. 21, 1965  C. W. WEILAND  3,207,245
GROUND EFFECT MACHINE

Filed Nov. 2, 1960  3 Sheets-Sheet 3

INVENTOR
CARL W. WEILAND

BY Cushman, Darby & Cushman
ATTORNEYS

United States Patent Office 3,207,245
Patented Sept. 21, 1965

3,207,245
GROUND EFFECT MACHINE
Carl Walter Weiland, % Reynolds Metals Co.,
Standford Field, Louisville, Ky.
Filed Nov. 2, 1960, Ser. No. 66,735
4 Claims. (Cl. 180—7)

This invention relates to improvements in ground effect vehicles of the type disclosed, for example, in my co-pending applications, Serial No. 767,575, filed October 16, 1958, and Serial No. 17,409 filed March 24, 1960.

The vehicles disclosed in those applications are adapted to be supported in the air but in close proximity to the ground on a cushion of air at superatmospheric pressure interposed between the vehicle and the ground. Such a vehicle has come to be known as a ground effect machine or vehicle. Vehicles of this type encounter no difficulty in traveling over relatively flat ground or earth surfaces, such as water, marsh or flat land terrain. On the other hand, because such vehicles by their very nature are adapted to be supported only a limited distance above the ground, they encounter difficulty in traveling over irregular terrain. In other words, when such a vehicle encounters an obstruction of a greater height than the elevation at which the vehicle normally travels, difficulty, if not an impossibility, will be had in surmounting such an obstruction.

Ground effect vehicles of the type under consideration derive their most beneficial effects by the elimination of any friction between the vehicles and the ground. Of course, the elimination of such friction is obtained even though such a vehicle is elevated and supported at only a very small height above the ground. Elevation and support of the vehicle to and at greater heights can be accomplished only by the use of greater power. The use of large power plants not only is expensive but also undesirably increases the weight of the vehicle.

It is therefore an object of this invention to provide a ground effect vehicle with means for facilitating the same to surmount obstacles higher than the elevation at which the vehicle is normally adapted to travel.

It is another object of this invention to provide a ground effect vehicle with simple non-powered means for enabling the vehicle to surmount and pass over obstructions of a height greater than that at which the vehicle is designed to normally travel.

In ground effect vehicles of the type which this invention is concerned, the instrumentalities employed to create and maintain the necessary supporting air cushion and to propel the vehicle horizontally in its elevated position usually are separate and distinct. Thus, for example, in many such vehicles designed to date, the supporting cushion is created by an impeller driven by an appropriate motor, while the vehicle is propelled horizontally by an air propeller driven by a separate appropriate motor. Obviously, the employment of two separate motors on a ground effect vehicle for separately performing the supporting and propelling functions tends to complicate the mechanical arrangements of the vehicle.

Accordingly, it is another object of this invention to provide a ground effect vehicle with means whereby a single motor may be employed to effectively accomplish both the elevating and supporting, and the propelling functions.

Other objects and advantages of the invention will become apparent from the following description and accompanying drawings in which.

Figure 2:
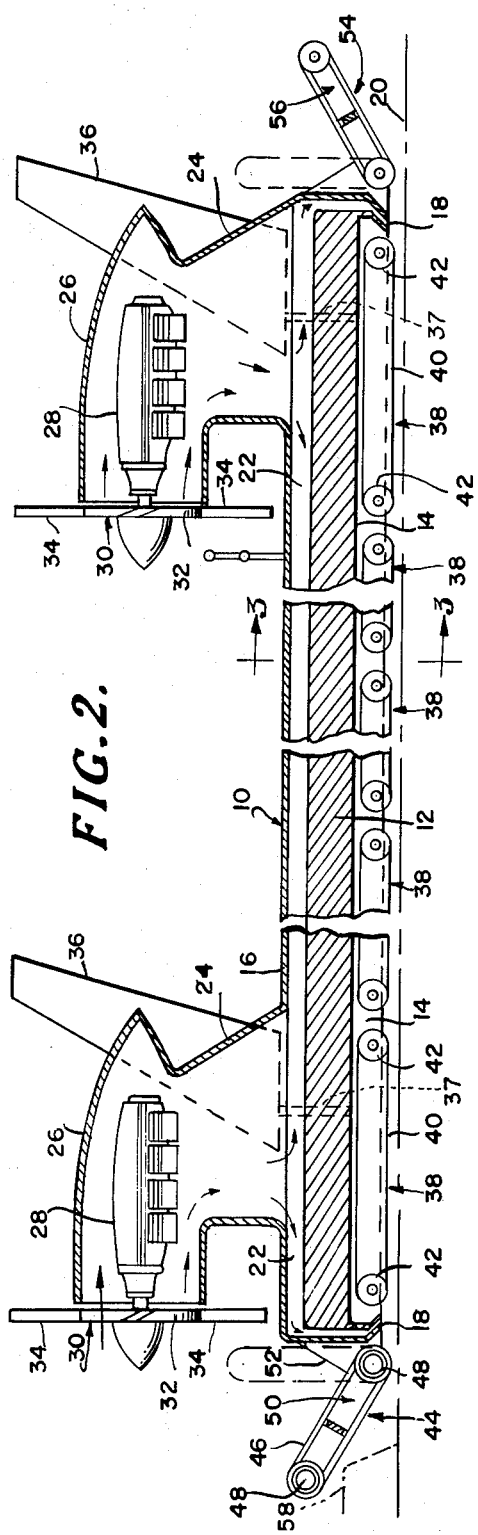
FIGURE 2 is a vertical, sectional view taken substantailly along the line 2—2 of FIGURE 1.
Figure 1:
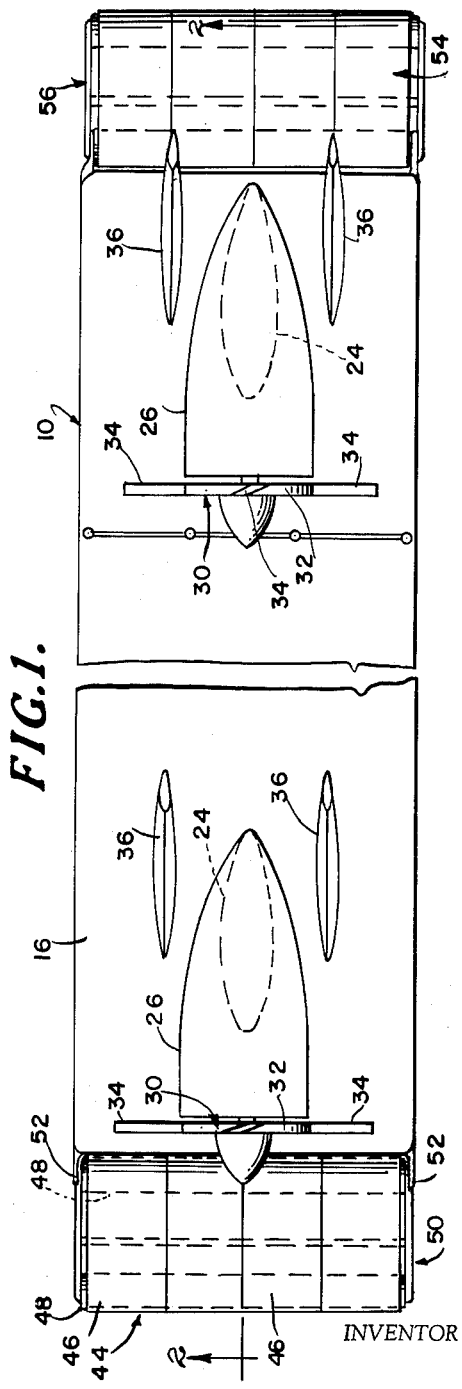
FIGURE 1 is a plan view of a ground effect vehicle embodying this invention.
Figure 3:
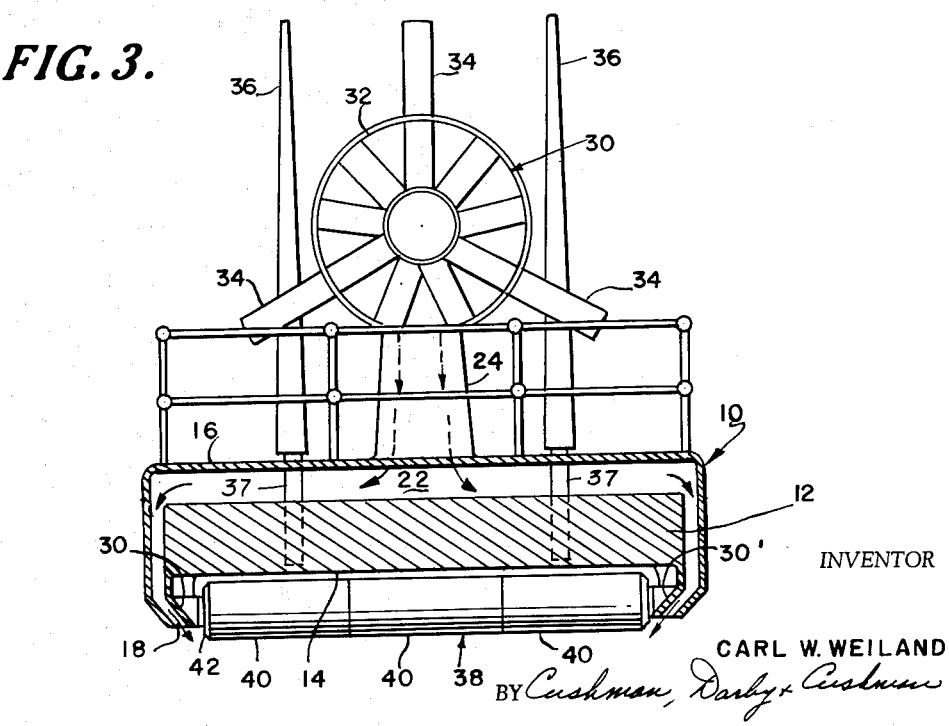
FIGURE 3 is a vertical, sectional view taken substantially along the line 3—3 of FIGURE 2.

Referring now to FIGURES 1 to 3 of the drawings, there is shown a ground effect machine or vehicle 10 embodying this invention and particularly adapted for use as a logistical vehicle or truck. The vehicle is designed not only to possess a relatively high load-carrying capacity, but also to have a high degree of mobility over somewhat irregular land terrain as well as over flat areas, such as swamps, marshes, or water. The vehicle 10 is provided with a main body portion 12 that is generally rectangular in planform and has an air-tight undersurface 14. Preferably, the main body portion 12 of the vehicle is constructed in the form of a float or pontoon of sufficient buoyancy to float the entire vehicle 10 when it alights on water. The thickness of the main body portion 12 may be relatively small as compared to its length and width, and as an example of proportions, the vehicle 10 illustrated in FIGURES 1 to 3 may have an overall body length of about 50 feet and a width of about 10 feet. It is estimated that such a vehicle, when appropriately powered, as described hereinafter, will have a payload of the order of 3½ tons and a top speed of the order of 60 miles an hour.

Above the main body portion 12, the vehicle 10 is provided with an open-bottom shell 16 having top, side, front and rear walls spaced respectively from the corresponding top, front and rear sides of the main body portion 12. The space between the shell 16 and the front, rear and sides of the main body portion 12 is arranged to define a substantially endless nozzle 18 surrounding the periphery of the undersurface 14 of the main body portion. The nozzle 18 is adapted to emit a downwardly directed jet-like curtain of air, as later explained, of sufficient velocity and volumetric rate of flow to create, between the vehicle undersurface 14 and the earth 20 a cushion of air at superatmospheric pressure sufficient to elevate the vehicle to a stable elevation above the earth. A normal operating elevation for the vehicle 10 shown in FIGURES 1 to 3 may be of the order of 4 inches. Preferably, the lower portions of the walls or surfaces which define the nozzle 18 are inclined inwardly, and have their lower edges disposed in the same horizontal plane, as shown, so that the peripheral jet-like curtain of air admitted by the nozzle will be directed inwardly, as well as downwardly, in order to aid in maintaining the cushion of air on which the vehicle 10 is adapted to be supported.

Air is supplied to the endless nozzle 18, to create the aforementioned jet-like curtain, directly from a plenum chamber 22 defined by and located between the top of the shell 16 and the upper surface of the main body portion 12. In this connection, the shell top may be appropriately reinforced to constitute a load-carrying floor or deck for the vehicle 10. Air is supplied to the plenum chamber 22 downwardly through one or more upright tubular posts or pedestals 24, each of which terminates at its upper end in an air scoop 26 having an open, preferably circular, forward end. Preferably, each post 24 is streamlined in horizontal section and each scoop 26 is likewise appropriately streamlined and constructed in the form of a nacelle so as to house therein an appropriate motor, such as an internal combustion engine 28. Each engine drives a multibladed air impeller 30 located immediately in front of and coaxial with the open mouth of the corresponding scoop 26. The diameter of the impeller 30 is substantially equal to the open front end of the scoop 26 so that the impeller will force air into the scoop, down through the corresponding pedestal 24, and into the plenum chamber 22 for distribution to the curtain-forming nozzle 18.

Mounted on the periphery of the impeller 30, as on an impeller ring 32, and extending radially outwardly therebeyond and beyond the rim of the air scoop 26, are two or more air propeller blades 34 adapted to propel the vehicle forwardly. The air propeller blades 32 may be equipped with variable pitch mechanism (not shown) so that the vehicle 10 may be raised to and maintained at its normal operating elevation without any forward movement. In a vehicle of the size and proportions mentioned above, two engine-impeller-propeller units may be employed, as shown in FIGURES 1 to 3, one at the forward end of the vehicle and one at the aft end. The vehicle 10 also preferably is equipped with pairs of laterally spaced vertical stabilizers 36, one pair for each engine-impeller-propeller unit with the stabilizers of each pair being located on opposite sides of a corresponding pedestal 24 in the windstream from the corresponding propeller blades 34. Preferably, each vertical stabilizer is mounted for pivotal movement about a vertical axis on a depending pivot pin 37 appropriately journalled in the vehicle and the stabilizers of each pair are connected together for simultaneous pivotal movement by appropriate mechanism (not shown). By means of this mounting, and by use of appropriate control mechanism (not shown), the vertical stabilizers 36 also may serve as rudders for directional control of the vehicle 10.

The undersurface 14 of the vehicle 10 is concave and provided with depending front, rear and side wall portions. Disposed partially within the concavity of the vehicle undersurface 14 is a longitudinal row of belt sets 38 having horizontal coplanar flights. Each set 38 includes a plurality of laterally spaced belts 40 trained over a common pair of front and rear rollers 42 journalled in the side wall portions of the undersurface concavity. The rollers 42 are so disposed that the lower flight of each belt 40 is disposed slightly below the lower edges of the walls defining the nozzle 18, i.e., below any of the rigid parts of the vehicle 10. The rollers 42 of each pair preferably are close enough to each other so that upward loads can be imposed on the lower flight of each belt 40 without pushing such flight upwardly into contact with the corresponding upper flight. In the embodiment of the invention illustrated in FIGURES 1 to 3, five longitudinally-spaced sets 38 of the belts 40 are shown, and each set may include three laterally arranged belts. Of course, the number and spacing of the belt sets 38, as well as the number of belts 40 in each set, may be varied according to the proportions and requirements of any particular vehicle. It is desirable also that each roller 42 be made up of a number of separate rollers, one for each belt 40, rotatably mounted on a common shaft.

Extending from the front of the vehicle 10 is another set 44 of belts 46 trained over a pair of spaced parallel transverse rollers 48 journalled in a swingable frame 50 which includes a pair of side members and one or more transverse brace members. The rear end of the frame 50 is journalled by and between (as by shaft extensions of the rear roller 48) a pair of side brackets 52 secured to the front of the vehicle 10 and extending forwardly thereof. The arrangement is such that the axis of the rear roller 48 is generally in the same plane as the axes of the rollers 42 but can be pivoted or swung between a generally upright stowed position, shown in dotted lines in FIGURE 2, and an operating or travelling position wherein the frame is inclined upwardly and forwardly, as shown in FIGURES 1 and 2. Any suitable means, such as is described in detail later with respect to the showings of FIGURES 4 to 6, may be employed to move the frame 50 between its operating and stowed positions and to maintain it in one of such positions. Mounted at the rear of the vehicle is another belt set 54 mounted on a swingable frame 56 identical to the arrangement at the front of the vehicle, but swingable, by appropriate mechanism (not shown) between a generally upright stowed position, shown in dotted lines in FIGURE 2, and an operating or travelling position wherein the frame 54 is inclined upwardly and rearwardly, as shown in FIGURES 1 and 2.

Because of the foregoing described arrangement of belt sets 38, 44, and 54, it will be seen that when the vehicle 10 is supported on its air cushion and is travelling in a forward direction, should it encounter an obstruction, such as shown at 58 in FIGURE 2, higher than the clearance between the underside of the vehicle and the earth, but lower than the upper end of the front inclined belt set 44, the latter will enable the vehicle to climb over the obstruction, while the belt sets 38 beneath the vehicle 10 will enable the latter to continue to travel over the obstruction without undue friction. As the aft end of the vehicle 10 passes beyond the obstruction, it will be seen that the upwardly inclined belt set 54 at the rear of the vehicle facilitates separating engagement between the vehicle and the obstruction without an undue drop on the part of the vehicle. Thus, even though the normal operating elevation of the vehicle 10 may be only four inches, the vehicle can pass over obstacles of the order, for example, of two feet in height, through the use of the undersurface belt sets 38 and fore and aft belt sets 44 and 54 having proportions similar to those shown in FIGURES 1 and 2.

Referring now to FIGURES 3 to 6 of the drawings, there is shown a ground effect machine or vehicle 60 of somewhat modified form. In particular, the vehicle 60 is designed as a relatively small personnel carrier, and for this purpose may be substantially smaller than the vehicle 10 illustrated in FIGURES 1 to 3. The general construction of the vehicle 60 essentially is the same as that of the vehicle 10 save that the vehicle 60 is much shorter, being, for example, of the order of 12 feet in length and 10 feet in width.

The vehicle 60 has a main body portion 62 and an open-bottom shell 64 which define a peripheral downwardly and inwardly directed curtain-like air-jet-forming nozzle 66 and a plenum chamber 68. Air is fed directly to the plenum chamber 68 through a single tubular pedestal 70 surmounted by an air scoop 72, engine 74 and impeller and propeller-blade assembly 76 substantially identical to those illustrated in FIGURES 1 to 3. Likewise, the vehicle 60 includes a pair of vertical stabilizers 78 that also serve as rudders. Suitable seats 80 for personnel may be provided on opposite sides of the pedestal 70, and appropriate guard rails 82 may be mounted on the deck of the vehicle 60 for protection against the propeller blades of the assembly 76. One of the forward seats 80 may have a steering wheel 84 mounted thereadjacent and connected by appropriate mechanism 86, to the steering rudders 78.

A vehicle of this type may be designed to travel, when appropriately powered, at a normal operating altitude or elevation at the order of about 2 inches above the earth. Such a vehicle, however, should be both fast and extremely mobile, that is, able to travel over relatively irregular terrain, and also to surmount relatively high obstacles. For this purpose, the vehicle may be provided with two longitudinally spaced sets 88 of belts 90, each trained over a common pair of spaced rollers 92 journalled in the depending side walls of a concavity in the undersurface 94 of the vehicle 60. Each belt set 88 may include four laterally arranged belts 90 trained over a common pair of rollers 92. As in the embodiment illustrated in FIGURES 1 to 3, the lower flight of each belt 90 projects slightly below the outlet end of the peripheral nozzle 66 so as to be located below any of the rigid parts of the vehicle 60.

Figure 5:
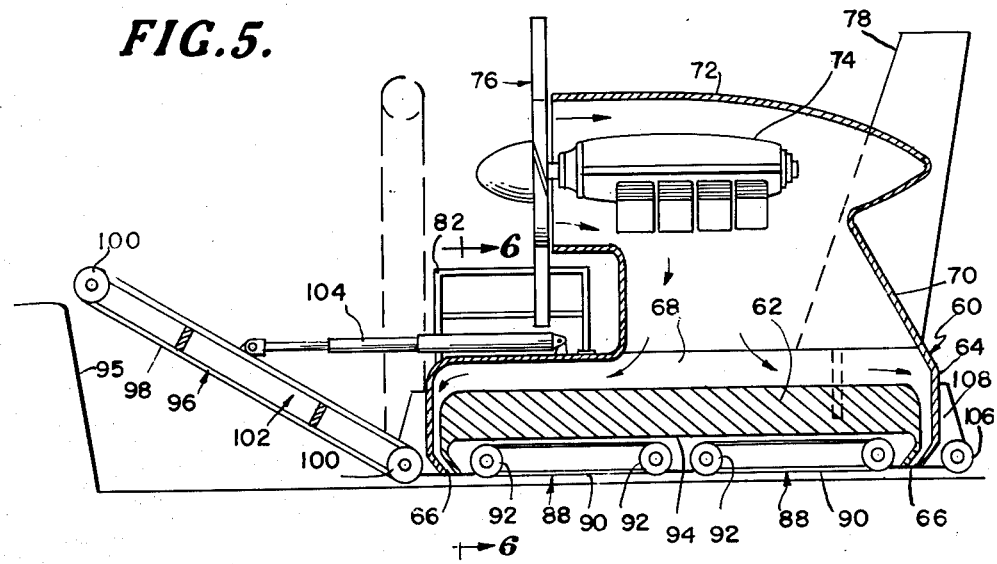
FIGURE 5 is a vertical, sectional view taken substantially along line 5—5 of FIGURE 4.

In order to enable the vehicle 60 to surmount relatively high obstacles, e.g., of the order of 4 feet, such as shown at 95 in FIGURE 5, another set 96 of belts 98 is mounted at the front of the vehicle over a pair of spaced transverse rollers 100 journalled in a swingable frame 102, as in the embodiment illustrated in FIGURES 1 to 3. The frame 102, however, is considerably longer than that in the embodiment described in FIGURES 1 to 3 and is proportioned so that when it is inclined upwardly and forwardly, as illustrated in FIGURE 5 of the drawings, its forward end is at least 4 feet or more above the earth when the vehicle 60 is at its normal operating elevation. In order to swing the frame 102 between its forwardly inclined travelling position and an upright stowed position, shown in dotted lines of FIGURE 5, a pair of telescoping hydraulic jacks 104 may be employed. One end of each jack 104 is appropriately pivotally connected to the deck of the vehicle 60 adjacent the front and one side thereof and the other end appropriately pivotally connected to a lug on the frame 102.

Figure 6:
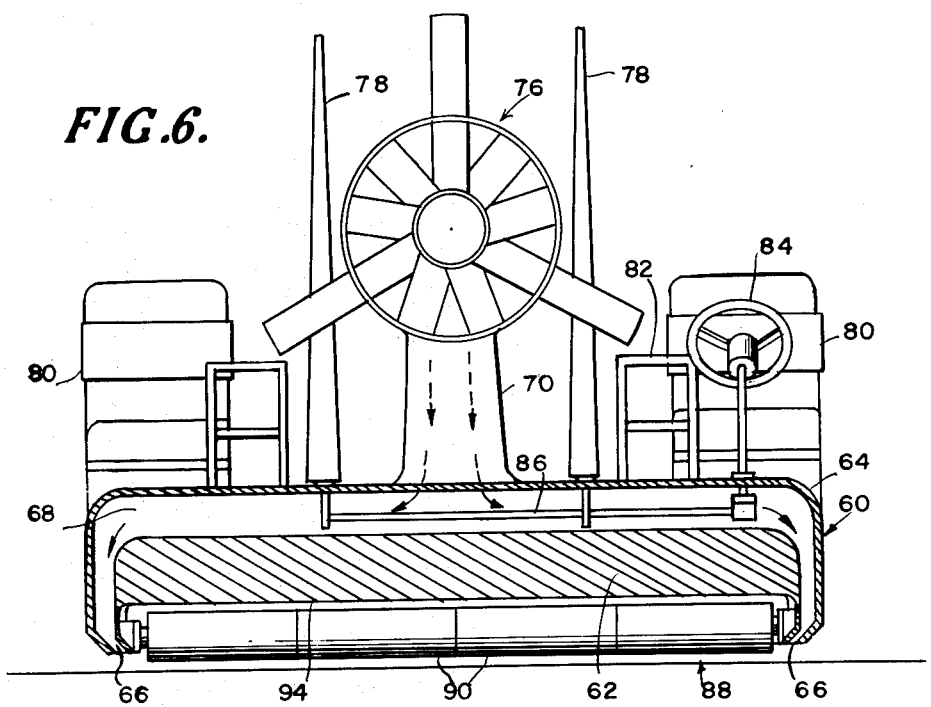
FIGURE 6 is a vertical, sectional view taken substantially along the line 6—6 of FIGURE 5.
Figure 4:
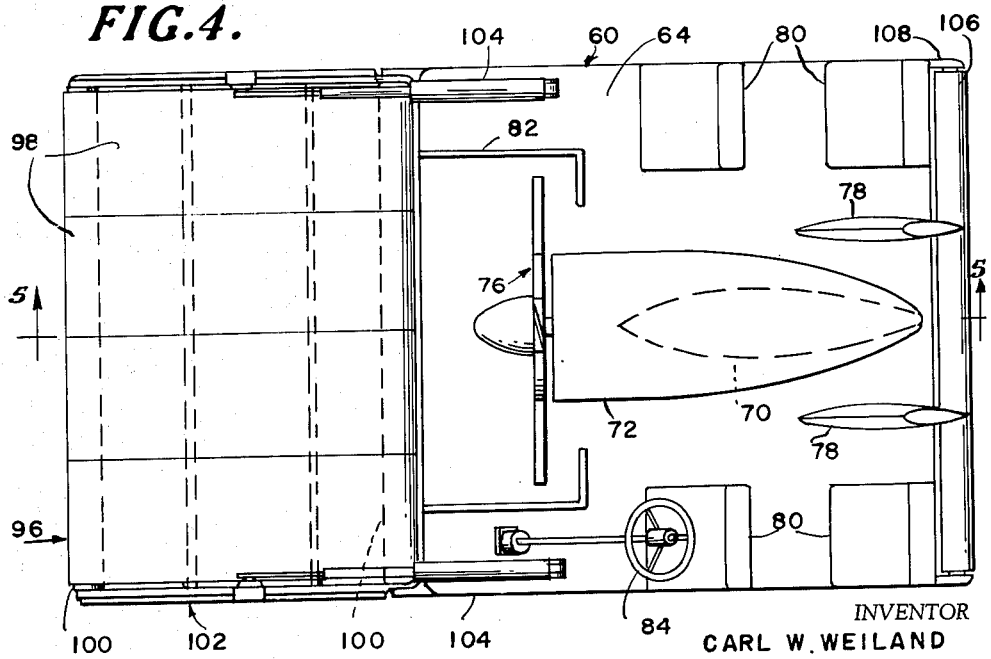
FIGURE 4 is a plan view of a somewhat modified ground effect vehicle embodying this invention.

In a relatively short vehicle, such as is illustrated in FIGURES 4 to 6, the rear belt set and swingable frame arrangement employed in the vehicle 10 illustrated in FIGURES 1 to 3, may be replaced by a single roller 106 journalled in and between two side brackets 108 extending from the rear of the vehicle. The axis of the roller 106 is substantially coplanar with the axes of the rollers 92.

A vehicle of the type illustrated in FIGURES 4 to 6 may, when appropriately powered, have a top speed of the order of a hundred miles per hour which will enable the same to almost hop over a four foot obstacle through the aid of the substantially frictionless upwardly and forwardly inclined belt set 96 to the undersurface belt sets 88. Because of the high speed of the vehicle, it is not considered necessary to employ any instrumentality, other than the single rear roller 106, to facilitate separation or parting of the vehicle from an obstacle.

It thus will be seen that the objects of this invention have been fully and effectively accomplished. It will be realized, however, that the specific embodiments illustrated and described are subject to modification without substantially departing from the principles of the invention. Therefore, the invention includes all modifications encompassed within the spirit and scope of the following claims.

I claim:

1. A ground effect vehicle comprising a body having an undersurface the major portion of which is substantially airtight; means mounted to said body for creating between said body and the earth a cushion of air under superatmospheric pressure sufficient to raise said vehicle to a stable elevation above the earth; means mounted to said body for propelling the same forwardly when at said stable elevation; movable antifriction means mounted to said body beneath said undersurface and substantially coextensive with the latter for preventing contact between any rigid parts of said body and an obstacle when said vehicle rides thereover, said antifriction means including at least one endless belt trained over a pair of longitudinally-spaced transverse rollers, the lower flight of said belt being disposed below the rigid parts of said body; and forwardly and upwardly inclined movable antifriction means mounted to said body at the front thereof and substantially coextensive with the width of said vehicle for facilitating movement of said vehicle over an obstacle higher than said stable elevation.

2. A ground effect vehicle comprising a body having an undersurface the major portion of which is substantially airtight; means mounted to said body for creating between said body and the earth a cushion of air under superatmospheric pressure sufficient to raise said vehicle to a stable elevation above the earth; means mounted to said body for propelling the same forwardly when at said stable elevation; movable antifriction means mounted to said body beneath said undersurface and substantially coextensive with the latter for preventing contact between any rigid parts of said body and an obstacle when said vehicle rides thereover; and forwardly and upwardly inclined movable antifriction means mounted to said body at the front thereof and substantially coextensive with the width of said vehicle for facilitating movement of said vehicle over an obstacle higher than said stable elevation, said last-mentioned antifriction means including at least one endless belt trained over a pair of transverse rollers and havings its lower flight extending upwardly and forwardly from a position adjacent the body undersurface.

3. The structure defined in claim 2 including a frame carrying the rollers and means mounting said frame to the body for swinging movement between an operative position wherein the lower flight extends upwardly and forwardly and a stowed position wherein said flight is substantially vertical.

4. A ground effect vehicle comprising a body having an undersurface the major portion of which is substantially airtight; means mounted to said body for creating between said body and the earth a cushion of air under superatmospheric pressure sufficient to raise said vehicle to a stable elevation above the earth; means mounted to said body for propelling the same forwardly when at said stable elevation; movable antifriction means mounted to said body beneath said undersurface and substantially coextensive with the latter for preventing contact between any rigid parts of said body and an obstacle when said vehicle rides thereover, said antifriction means including a plurality of sets of endless belts trained over transverse rollers, the lower flight of said belts being disposed below the rigid parts of said body; and forwardly and upwardly inclined movable antifriction means mounted to said body at the front thereof and substantially coextensive with the width of said vehicle for facilitating movement of said vehicle over an obstacle higher than said stable elevation.

References Cited by the Examiner

UNITED STATES PATENTS

| | | | |
|---|---|---|---|
| 936,395 | 10/09 | Worthington | 180—7 |
| 1,592,654 | 7/26 | Bremer | 180—9.32 |
| 2,306,096 | 12/42 | Vose | 180—166 X |
| 2,322,790 | 6/43 | Cristadoro | 180—7 |
| 2,444,318 | 6/48 | Warner | 180—1 |
| 2,514,487 | 7/50 | Griese | 170—166 X |
| 2,880,945 | 4/59 | Crane | 180—1 |
| 3,066,753 | 12/62 | Hurley et al. | 180—7 |

FOREIGN PATENTS

| | | |
|---|---|---|
| 219,133 | 1/59 | Australia. |
| 1,238,499 | 7/60 | France. |

OTHER REFERENCES

"Flight," Sept. 11, 1959, pages 195–198.

D.T.M.B. Report, "Ground Cushion Research at the David Taylor Model Basin — A Brief Summary of Progress To Date," Oct. 21, 1959.

FERGUS S. MIDDLETON, *Primary Examiner.*

PHILIP ARNOLD, A. HARRY LEVY, MILTON BUCHLER, *Examiners.*